US012224503B2

(12) United States Patent
Hashimoto

(10) Patent No.: US 12,224,503 B2
(45) Date of Patent: Feb. 11, 2025

(54) ANTENNA ELEMENT

(71) Applicant: Murata Manufacturing Co., Ltd., Nagaokakyo (JP)

(72) Inventor: Takuya Hashimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 195 days.

(21) Appl. No.: 18/122,164

(22) Filed: Mar. 16, 2023

(65) Prior Publication Data

US 2023/0216200 A1 Jul. 6, 2023

Related U.S. Application Data

(63) Continuation of application No. PCT/JP2021/028760, filed on Aug. 3, 2021.

(30) Foreign Application Priority Data

Sep. 24, 2020 (JP) ................................ 2020-159295

(51) Int. Cl.
*H01Q 1/48* (2006.01)
*H01Q 9/04* (2006.01)

(52) U.S. Cl.
CPC ............ *H01Q 9/0407* (2013.01); *H01Q 1/48* (2013.01)

(58) Field of Classification Search
CPC .............................. H01Q 9/0407; H01Q 1/48
See application file for complete search history.

(56) References Cited

U.S. PATENT DOCUMENTS

| | | | |
|---|---|---|---|
| 6,218,989 | B1 | 4/2001 | Schneider et al. |
| 2004/0189532 | A1 | 9/2004 | Nakano et al. |
| 2005/0099338 | A1 | 5/2005 | Noro et al. |
| 2017/0365920 | A1 | 12/2017 | Mukai et al. |

FOREIGN PATENT DOCUMENTS

| | | | |
|---|---|---|---|
| JP | 02101802 | A | 4/1990 |
| JP | 04154303 | A | 5/1992 |
| JP | 2004304621 | A | 10/2004 |
| JP | 2005142786 | A | 6/2005 |
| JP | 2007097115 | A | 4/2007 |
| JP | 2017225041 | A | 12/2017 |

OTHER PUBLICATIONS

International Search Report in PCT/JP2021/028760, mailed Oct. 19, 2021, 3 pages.
Written Opinion in PCT/JP2021/028760, mailed Oct. 19, 2021, 4 pages.

*Primary Examiner* — Graham P Smith
(74) *Attorney, Agent, or Firm* — Keating & Bennett, LLP

(57) ABSTRACT

In an antenna element, a planar ground conductor layer on an insulation substrate is connected to ground. A radiation conductor layer radiates and/or receives high-frequency signals. The radiation conductor layer is in or on the insulation substrate and above the planar ground conductor layer. A lower principal surface of the radiation conductor layer overlaps an upper principal surface of the planar ground conductor layer as viewed in an up-down direction. The ground conductor is in the insulation substrate and connected to the ground potential. An upper end of the ground conductor is above the radiation conductor layer. The ground conductor layer is spaced away from the radiation conductor layer as viewed in the up-down direction. Only a conductor through which the high-frequency signals are transmitted and a conductor connected to the ground potential are between the ground conductor and the radiation conductor layer.

20 Claims, 10 Drawing Sheets

ANTENNA ELEMENT

CROSS REFERENCE TO RELATED APPLICATIONS

This application claims the benefit of priority to Japanese Patent Application No. 2020-159295 filed on Sep. 24, 2020 and is a Continuation Application of PCT Application No. PCT/JP2021/028760 filed on Aug. 3, 2021. The entire contents of each application are hereby incorporated herein by reference.

BACKGROUND OF THE INVENTION

1. Field of the Invention

The present invention relates to an antenna element that includes a patch antenna.

2. Description of the Related Art

A known invention related to an antenna element is a patch antenna described in Japanese Unexamined Patent Application Publication No. 2007-97115. The patch antenna includes a dielectric block, a ground electrode, a passive electrode, a radiation electrode, and a connection electrode. The dielectric block is shaped like a disc having an upper principal surface and a lower principal surface. The ground electrode is disposed on the lower principal surface of the dielectric block. The radiation electrode is disposed on the upper principal surface of the dielectric block near the center thereof. The passive electrode is disposed on the upper principal surface of the dielectric block. The passive electrode has an annular shape that surrounds the radiation electrode as viewed in the up-down direction. The connection electrode is disposed on a side surface of the dielectric block. The connection electrode electrically connects the passive electrode to the ground electrode. In the patch antenna configured as above, the radiation electrode transmits and/or receives high-frequency signals.

SUMMARY OF THE INVENTION

An improvement in directivity is desired in the patch antenna described in Japanese Unexamined Patent Application Publication No. 2007-97115.

Preferred embodiments of the present invention provide antenna elements in each of which the directivity of the patch antenna is improved.

According to a preferred embodiment of the present invention, an antenna element includes an insulation substrate, a first planar ground conductor layer, a first radiation conductor layer, and a first ground conductor. The first planar ground conductor layer is connected to a ground potential and on the insulation substrate. The first radiation conductor layer is operable to radiate and/or receive first high-frequency signals. The first radiation conductor layer is in or on the insulation substrate and above the first planar ground conductor layer. A lower principal surface of the first radiation conductor layer overlaps an upper principal surface of the first planar ground conductor layer as viewed in an up-down direction. The first ground conductor is in the insulation substrate and connected to the ground potential. An upper end of the first ground conductor is above the first radiation conductor layer. The first ground conductor layer is spaced away from the first radiation conductor layer as viewed in the up-down direction. No conductor is present between the first ground conductor and the first radiation conductor layer except for a conductor through which the first high-frequency signals are transmitted and a conductor connected to the ground potential.

The antenna elements according to preferred embodiments of the present invention improve the directivity of the patch antennas.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiments

Structure of Antenna Element 10

Figure 1:
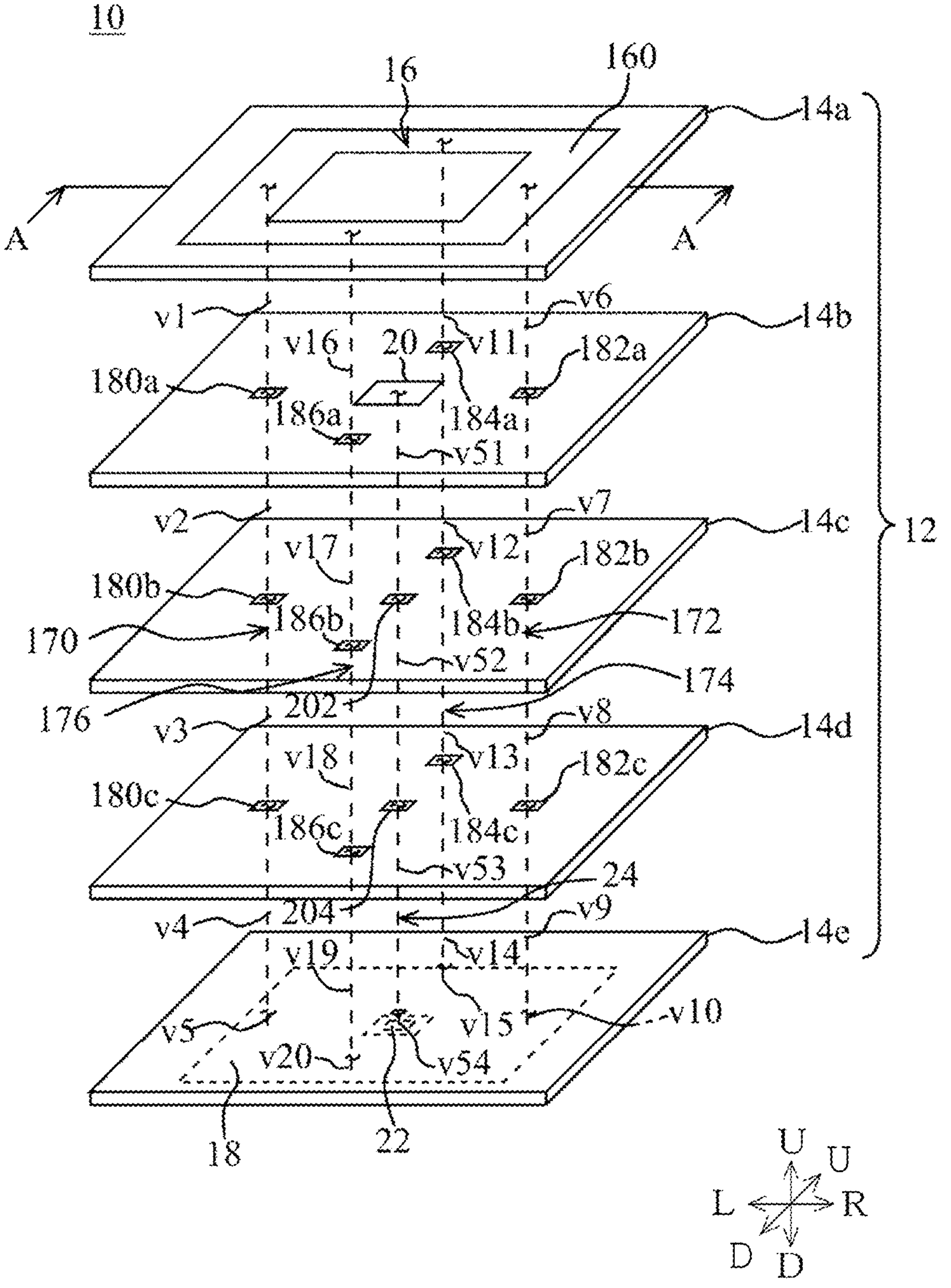
FIG. 1 is an exploded perspective view illustrating an antenna element 10.
Figure 2:
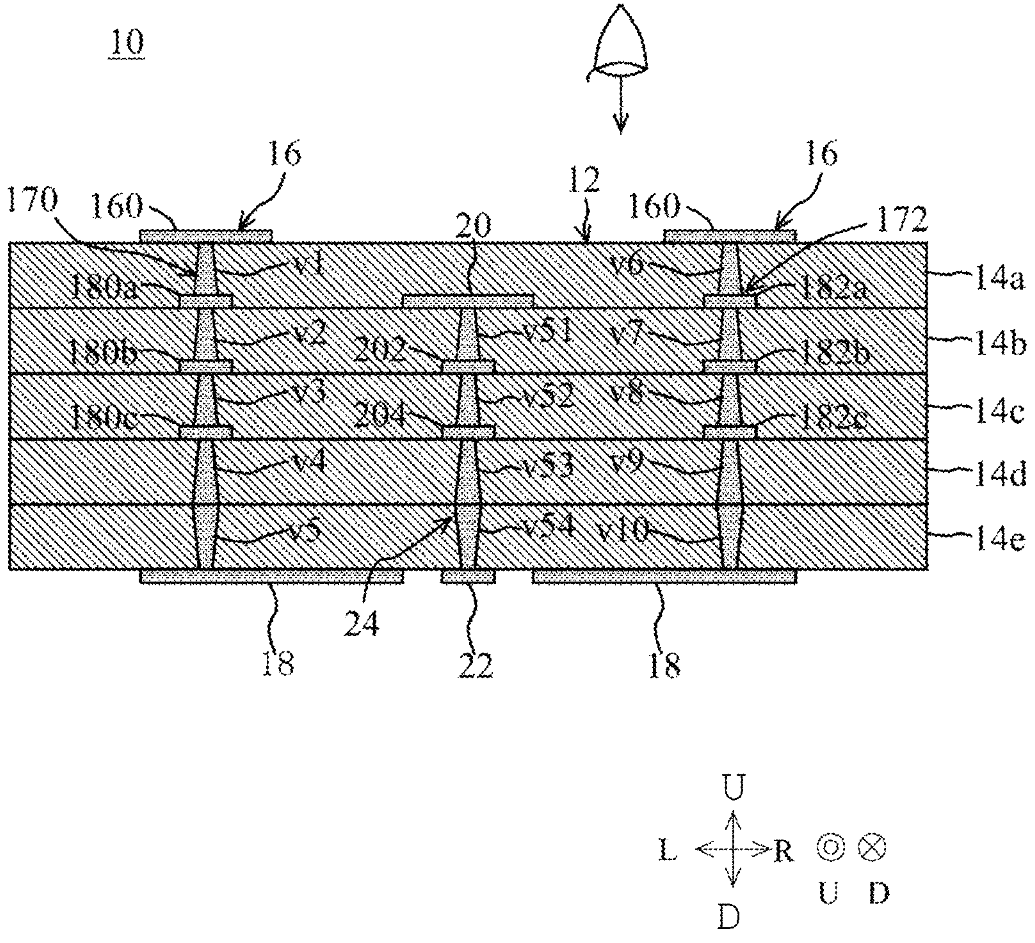
FIG. 2 is a cross-sectional view illustrating the antenna element 10 taken along line A-A in FIG. 1.

The structure of an antenna element 10 according to a preferred embodiment of the present invention will be described with reference to the drawings. FIG. 1 is an exploded perspective view illustrating the antenna element 10. FIG. 2 is a cross-section of the antenna element 10 taken along line A-A in FIG. 1.

In the following description, the up-down direction is defined as the direction in which layers of an insulation substrate 12 of the antenna element 10 are laminated. The antenna element 10 has a rectangular or substantially rectangular shape as viewed in the up-down direction. As viewed in the up-down direction, the right-left direction is defined as the direction in which the long sides of the antenna element 10 extend. As viewed in the up-down direction, the front-back direction is defined as the direction in which the short sides of the antenna element 10 extend. The up-down direction, the right-left direction, and the front-back direction orthogonally intersect each other. Note that the above definitions of directions are merely examples. The directions of the antenna element 10 in the present specification do not necessarily reflect actual directions when the antenna element 10 is in use. In the drawings, the up-down direction may be reversed. Similarly, the right-left direction may be reversed, and the front-back direction may be reversed.

Let X denote a component or a member of the antenna element 10 in this paragraph. In the present specification, portions of X are defined as follows unless otherwise specified. A "front portion" of X means a front half portion of X. A "back portion" of X means a back half portion of X. A "left portion" of X means a left half portion of X. A "right portion" of X means a right half portion of X. An "upper portion" of X means an upper half portion of X. A "lower portion" of X means a lower half portion of X. A "front end" of X means a frontward end of X. A "back end" of X means a backward end of X. A "left end" of X means a leftward end of X. A "right end" of X means a rightward end of X. An "upper end" of X means an upward end of X. A "lower end" of X means a downward end of X. A "front end portion" of X means the frontward end and its vicinity of X. A "back end portion" of X means the backward end and its vicinity of X. A "left end portion" of X means the leftward end and its vicinity of X. A "right end portion" of X means the rightward end and its vicinity of X. An "upper end portion" of X means the upward end and its vicinity of X. A "lower end portion" of X means the downward end and its vicinity of X.

The antenna element 10 is used, for example, in an electronic device, such as a mobile phone. As illustrated in FIG. 1, the antenna element 10 includes an insulation substrate 12, a first ground conductor 16, a planar ground conductor layer 18 (a first planar ground conductor layer), a first radiation conductor layer 20, a signal electrode 22, and a connection member 24.

The insulation substrate 12 has a tabular shape. The insulation substrate 12 has a rectangular or substantially rectangular shape as viewed in the up-down direction. The insulation substrate 12 has a structure in which insulator layers 14*a* to 14*e* are laminated in the up-down direction. The insulator layers 14*a* to 14*e* are disposed in this order from the top. The insulator layers 14*a* to 14*e* are made of a thermoplastic resin, such as polyimide or a liquid crystal polymer.

The first ground conductor 16, the planar ground conductor layer 18, and the first radiation conductor layer 20 define and function as a patch antenna. The planar ground conductor layer 18 is disposed on the insulation substrate 12. More specifically, the planar ground conductor layer 18 is disposed on the lower principal surface of the insulator layer 14*e*. Accordingly, the planar ground conductor layer 18 is disposed on the lower principal surface of the insulation substrate 12. As illustrated in FIG. 1, the planar ground conductor layer 18 has a rectangular or substantially rectangular shape as viewed in the up-down direction. The long sides of the planar ground conductor layer 18 extend in the right-left direction. The short sides of the planar ground conductor layer 18 extend in the front-back direction. The planar ground conductor layer 18 is connected to a ground potential.

The first radiation conductor layer 20 radiates and/or receives first high-frequency signals. The first radiation conductor layer 20 is disposed in the insulation substrate 12. More specifically, the first radiation conductor layer 20 is disposed on the upper principal surface of the insulator layer 14*b*. Accordingly, the first radiation conductor layer 20 is positioned above the planar ground conductor layer 18. Here, when the first radiation conductor layer 20 is disposed above the planar ground conductor layer 18, the following condition is satisfied. Suppose that the planar ground conductor layer 18 is translated upward. When the planar ground conductor layer 18 passes a region, a portion of the first radiation conductor layer 20 is positioned within the region. In other words, the first radiation conductor layer 20 may be positioned within, or may protrude from, the region through which the planar ground conductor layer 18 passes if the planar ground conductor layer 18 is translated upward. The lower principal surface of the first radiation conductor layer 20 overlaps the upper principal surface of the planar ground conductor layer 18 as viewed in the up-down direction.

The signal electrode 22 is disposed on the lower principal surface of the insulator layer 14*e*. The signal electrode 22 is surrounded by the planar ground conductor layer 18 as viewed in the up-down direction. The signal electrode 22, however, is isolated from the planar ground conductor layer 18. When the first radiation conductor layer 20 radiates and/or receives first high-frequency signals, the first high-frequency signals are input in and/or output from the signal electrode 22.

The connection member 24 electrically connects the first radiation conductor layer 20 to the signal electrode 22. More specifically, the connection member 24 includes in-layer connection conductors v51 to v54 and connection conductor layers 202 and 204. The in-layer connection conductors v51 to v54 pierce respective insulator layers 14*b* to 14*e* in the up-down direction. The connection conductor layer 202 is disposed between the in-layer connection conductor v51 and the in-layer connection conductor v52. The connection conductor layer 204 is disposed between the in-layer connection conductor v52 and the in-layer connection conductor v53.

The first ground conductor 16 is disposed in the insulation substrate 12. More specifically, the first ground conductor 16 is a ground conductor positioned above the planar ground conductor layer 18. The first ground conductor 16 includes an upper-end ground conductor layer 160, connection conductor layers 180*a* to 180*c*, 182*a* to 182*c*, 184*a* to 184*c*, and 186*a* to 186*c*, and in-layer connection conductors v1 to v20. The upper-end ground conductor layer 160 is the uppermost conductor among the upper-end ground conductor layer 160, the connection conductor layers 180*a* to 180*c*, 182*a* to 182*c*, 184*a* to 184*c*, and 186*a* to 186*c*, and the in-layer connection conductors v1 to v20. Accordingly, the upper-end ground conductor layer 160 includes the upper end of the first ground conductor 16. In the present preferred embodiment, the upper principal surface of the upper-end ground conductor layer 160 serves as the upper end of the first ground conductor 16.

The upper-end ground conductor layer 160 is disposed on the upper principal surface of the insulator layer 14*a*. The upper-end ground conductor layer 160 is shaped like a rectangular or substantially rectangular frame as viewed in the up-down direction. Accordingly, the outside periphery of the upper-end ground conductor layer 160 is shaped like a rectangle or approximate rectangle as viewed in the up-down direction. The long sides of the upper-end ground conductor layer 160 extend in the right-left direction. The short sides of the upper-end ground conductor layer 160 extend in the front-back direction. A region in which a conductor layer is not present is formed inside the upper-end ground conductor layer 160. As viewed in the up-down direction, the entire first radiation conductor layer 20 overlaps the region in which the conductor layer is not present. In other words, the upper-end ground conductor layer 160 does not overlap the first radiation conductor layer 20 as viewed in the up-down direction. Accordingly, the upper-end ground conductor layer 160 has a belt shape that surrounds the first radiation conductor layer 20 as viewed in the up-down direction.

The upper-end ground conductor layer 160, which includes the upper end of the first ground conductor 16, is disposed on the upper principal surface of the insulator layer 14*a*. On the other hand, the first radiation conductor layer 20 is disposed on the upper principal surface of the insulator layer 14*b*. Accordingly, as illustrated in FIG. 2, the upper end of the first ground conductor 16 (i.e., the upper principal surface of the upper-end ground conductor layer 160) is positioned above the first radiation conductor layer 20. In the present specification, when the upper end of the first ground conductor 16 (the upper principal surface of the upper-end ground conductor layer 160) is disposed above the first radiation conductor layer 20, the following condition is satisfied. The upper end of the first ground conductor 16 (the upper principal surface of the upper-end ground conductor layer 160) is positioned in a space above the plane that passes through the upper end of the first radiation conductor layer 20 and orthogonally intersects the up-down direction. In this case, the upper end of the first ground conductor 16 (the upper principal surface of the upper-end ground conductor layer 160) and the first radiation conductor layer 20 may be flush with each other or may be positioned differently in the up-down direction.

A connection member 170 includes in-layer connection conductors v1 to v5 and connection conductor layers 180*a* to 180*c*. The connection member 170 is disposed in the left portion of the insulation substrate 12. The connection member 170 is disposed to the left of the first radiation conductor layer 20 as viewed in the up-down direction. The connection member 170 electrically connects the upper-end ground conductor layer 160 to the planar ground conductor layer 18. More specifically, the in-layer connection conductors v1 to v5 pierce respective insulator layers 14*a* to 14*e* in the up-down direction. The connection conductor layer 180*a* is disposed between the in-layer connection conductor v1 and the in-layer connection conductor v2. The connection conductor layer 180*b* is disposed between the in-layer connection conductor v2 and the in-layer connection conductor v3. The connection conductor layer 180*c* is disposed between the in-layer connection conductor v3 and the in-layer connection conductor v4. Consequently, the first ground conductor 16 is connected to the ground potential.

A connection member 172 includes in-layer connection conductors v6 to v10 and connection conductor layers 182*a* to 182*a*. The connection member 172 is disposed in the right portion of the insulation substrate 12. The connection member 172 is disposed to the right of the first radiation conductor layer 20 as viewed in the up-down direction. Note that the structures of the in-layer connection conductors v6 to v10 and the connection conductor layers 182*a* to 182*c* are the same as those of the in-layer connection conductors v1 to v5 and the connection conductor layers 180*a* to 180*c*, and duplicated descriptions are omitted.

A connection member 174 includes in-layer connection conductors v11 to v15 and connection conductor layers 184*a* to 184*c*. The connection member 174 is disposed in the front portion of the insulation substrate 12. The connection member 174 is disposed in front of the first radiation conductor layer 20 as viewed in the up-down direction. Note that the structures of the in-layer connection conductors v11 to v15 and the connection conductor layers 184*a* to 184*a* are the same as those of the in-layer connection conductors v1 to v5 and the connection conductor layers 180*a* to 180*c*, and duplicated descriptions are omitted.

A connection member 176 includes in-layer connection conductors v16 to v20 and connection conductor layers 186*a* to 186*c*. The connection member 176 is disposed in the back portion of the insulation substrate 12. The connection member 176 is disposed at the back of the first radiation conductor layer 20 as viewed in the up-down direction. Note that the structures of the in-layer connection conductors v16 to v20 and the connection conductor layers 186*a* to 186*c* are the same as those of the in-layer connection conductors v1 to v5 and the connection conductor layers 180*a* to 180*c*, and duplicated descriptions are omitted.

For example, copper foils adhered onto the upper or lower principal surfaces of the insulator layer 14*a* to 14*e* are patterned to define the planar ground conductor layer 18, the first radiation conductor layer 20, the upper-end ground conductor layer 160, and the connection conductor layers 180*a* to 180*c*, 182*a* to 182*c*, 184 to 184*c*, and 186*a* to 186*c*. The in-layer connection conductors v1 to v20 are, for example, via-hole conductors. The via-hole conductors are formed by forming through-holes in the insulator layers 14*a* to 14*e*, filling the through-holes with conductive paste, and sintering the conductive paste.

The first ground conductor layer 16 formed as described above is spaced away from the first radiation conductor layer 20 as viewed in the up-down direction. In other words, the first ground conductor 16 does not overlap the first radiation conductor layer 20 as viewed in the up-down direction. In addition, as viewed in the up-down direction, no conductor is provided between the first ground conductor 16 and the first radiation conductor layer 20 except for the conductor through which the first high-frequency signals are transmitted and the conductor connected to the ground potential. In the present preferred embodiment, the planar ground conductor layer 18 is present and the other conductors are not present between the first ground conductor 16 and the first radiation conductor layer 20 as viewed in the up-down direction.

Advantageous Effect

The antenna element 10 can improve the directivity of the patch antenna. More specifically, in the patch antenna described in the Japanese Unexamined Patent Application Publication No. 2007-97115, a passive electrode is annularly shaped and surrounds the radiation electrode. The passive electrode is positioned at the same level of the radiation electrode in the up-down direction. Accordingly, the passive electrode is present at positions to the front, back, right, left of the radiation electrode. In this case, the high-frequency signal radiated from the radiation electrode is impeded by the passive electrode from propagating in the front-back and right-left directions.

On the other hand, the upper end of the first ground conductor 16 (the upper principal surface of the upper-end ground conductor layer 160) is positioned above the first radiation conductor layer 20. Accordingly, the upper end of the first ground conductor 16 (the upper principal surface of the upper-end ground conductor layer 160) is positioned obliquely above the first radiation conductor layer 20. As a result, the high-frequency signal radiated by the first radiation conductor layer 20 is impeded by the first ground conductor 16 from propagating obliquely upward from the first radiation conductor layer 20. Accordingly, the angle of radiation of the high-frequency signal radiated from the antenna element 10 is smaller than that of the high-frequency signal radiated from the patch antenna of Japanese Unexamined Patent Application Publication No. 2007-

97115. Thus, the antenna element 10 improves the directivity of the patch antenna. Note that the directivity of the patch antenna is also improved when the first radiation conductor layer 20 receives a high-frequency signal, as is the case for the first radiation conductor layer 20 radiating a high-frequency signal.

The antenna element 10 improves the upward directivity of the patch antenna. More specifically, the upper-end ground conductor layer 160 has the belt shape that surrounds the first radiation conductor layer 20 as viewed in the up-down direction. As a result, the high-frequency signal radiated from the first radiation conductor layer 20 is impeded by the upper-end ground conductor layer 160 from obliquely propagating to the upper front, to the upper back, to the upper left, and to the upper right of the first radiation conductor layer 20. Thus, the antenna element 10 improves the upward directivity of the patch antenna.

In addition, as viewed in the up-down direction, no conductor is provided between the first ground conductor 16 and the first radiation conductor layer 20 in the antenna element 10 except for the conductor through which the first high-frequency signals are transmitted and the conductor connected to the ground potential. This enables the first radiation conductor layer 20, the first ground conductor 16, and the planar ground conductor layer 18 to function as the patch antenna.

FIRST MODIFICATION

Figure 3:
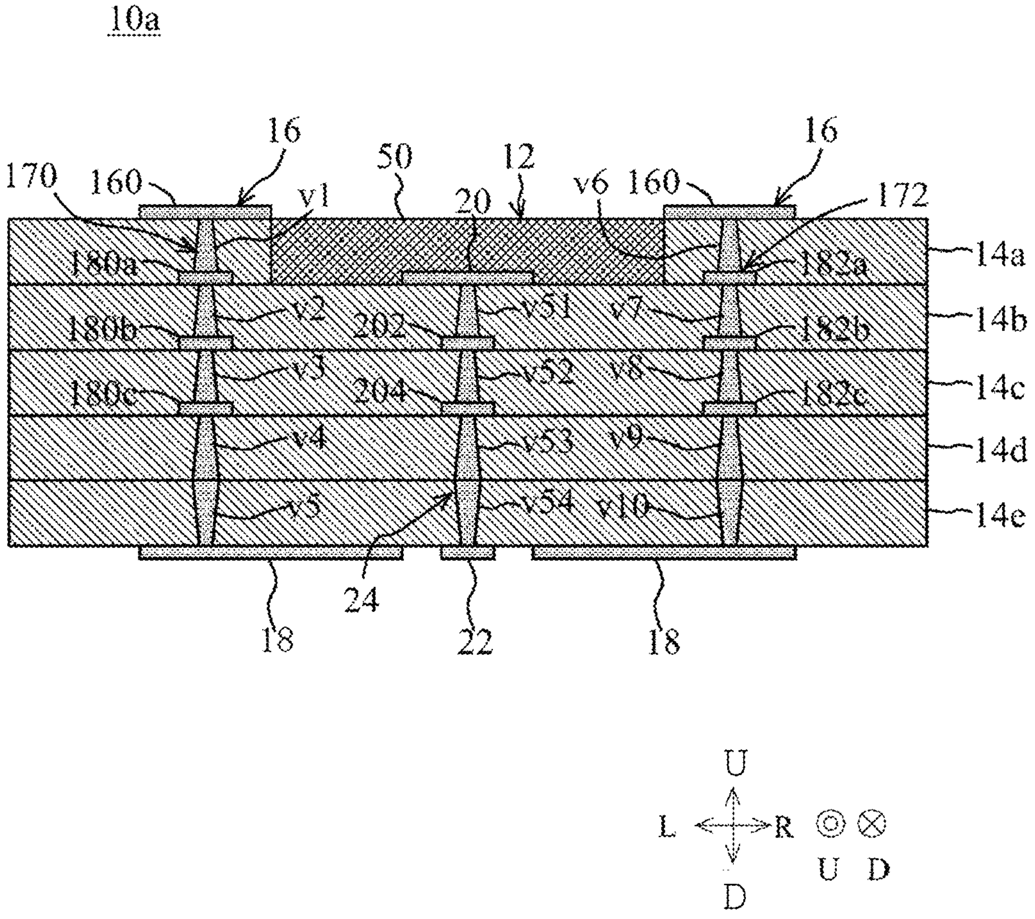
FIG. 3 is a cross-sectional view illustrating an antenna element 10*a*.

An antenna element 10*a* according to a first modification of a preferred embodiment of the present invention will be described with reference to the drawings. FIG. 3 is a cross-sectional view illustrating the antenna element 10*a*. The cross-section of the antenna element 10*a* in FIG. 3 is taken along the line corresponding to line A-A in FIG. 1.

The antenna element 10*a* is different from the antenna element 10 in that the antenna element 10*a* further include a first insulation member 50. The first insulation member 50 is disposed on the insulation substrate 12. The first insulation member 50 overlaps the first radiation conductor layer 20 as viewed in the up-down direction. More specifically, the insulator layer 14*a* is not present in a region surrounded by the upper-end ground conductor layer 160 as viewed in the up-down direction. In addition, the first insulation member 50 is disposed, in place of the insulator layer 14*a*, in the region surrounded by the upper-end ground conductor layer 160. More specifically, a recess is located at the upper principal surface of the insulation substrate 12, and the first insulation member 50 is disposed in the recess. The dielectric constant of the first insulation member 50 is higher than that of the insulation substrate 12. Other structural features of the antenna element 10*a* are the same as those of the antenna element 10, and duplicated descriptions will be omitted.

According to the antenna element 10*a*, the dielectric constant of the first insulation member 50 is higher than that of the insulation substrate 12. In addition, the first insulation member 50 overlaps the first radiation conductor layer 20 as viewed in the up-down direction. The provision of the first insulation member 50 enables the patch antenna to have antenna characteristics adaptable to a wider bandwidth.

SECOND MODIFICATION

Figure 4:
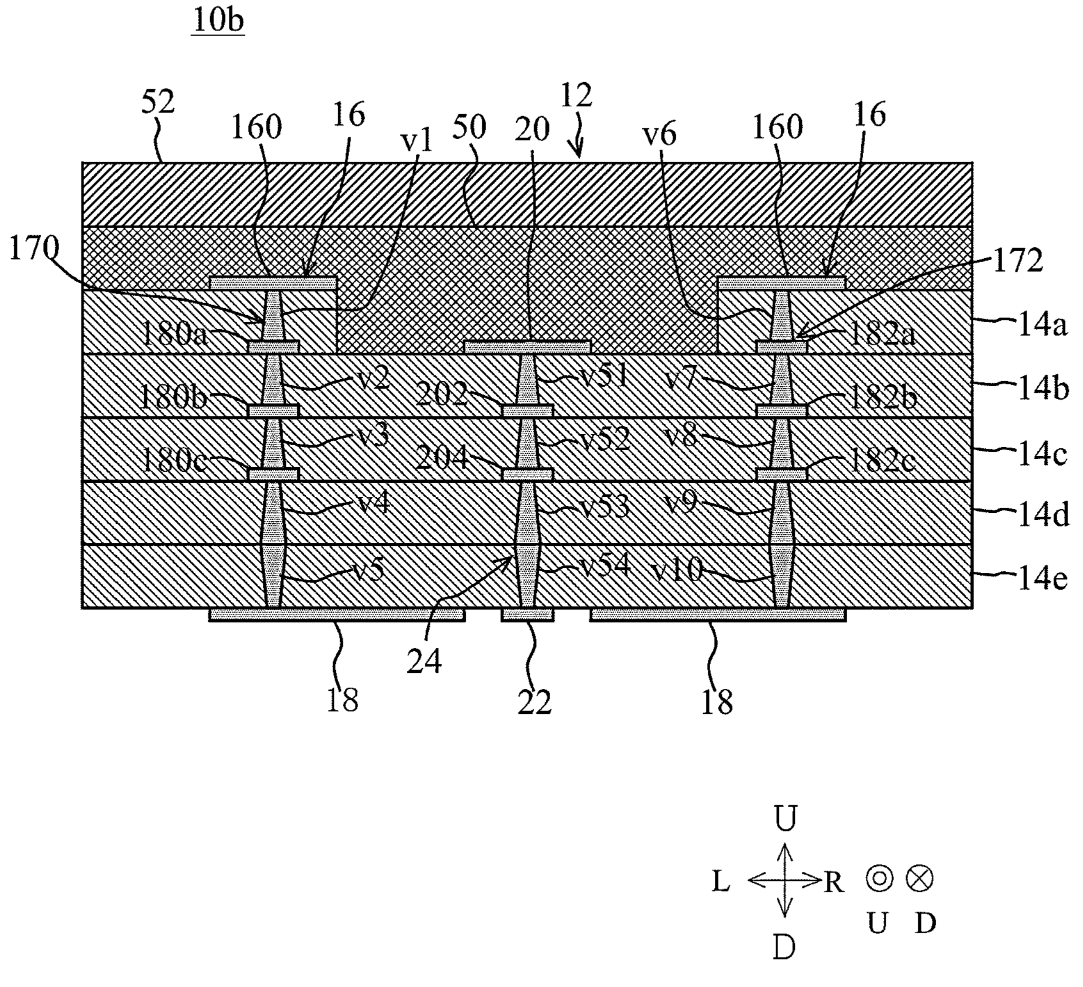
FIG. 4 is a cross-sectional view illustrating an antenna element 10*b*.

An antenna element 10*b* according to a second modification of a preferred embodiment of the present invention will be described with reference to the drawings. FIG. 4 is a cross-sectional view illustrating the antenna element 10*b*. The cross-section of the antenna element 10*b* in FIG. 4 is taken along the line corresponding to line A-A in FIG. 1.

The antenna element 10*b* is different from the antenna element 10*a* in that the first insulation member 50 of the antenna element 10*b* is different in shape and the antenna element 10*b* further includes a second insulation member 52. The first insulation member 50 further overlaps the first ground conductor 16 as viewed in the up-down direction. The first insulation member 50 entirely covers the upper principal surface of the insulation substrate 12. The second insulation member 52 is disposed on the first insulation member 50. The second insulation member 52 entirely covers the upper principal surface of the first insulation member 50. The second insulation member 52 overlaps the first radiation conductor layer 20 as viewed in the up-down direction. The dielectric constant of the second insulation member 52 is higher than that of the first insulation member 50. Other structural features of the antenna element 10*b* are the same as those of the antenna element 10*a*, and duplicated descriptions will be omitted.

According to the antenna element 10*b*, the dielectric constants of the first insulation member 50 and the second insulation member 52 formed on the first radiation conductor layer 20 are such that the dielectric constant becomes higher as it goes upward. The provision of the first insulation member 50 and the second insulation member 52 reduces the degradation of the radiation efficiency of the patch antenna.

THIRD MODIFICATION

Figure 5:
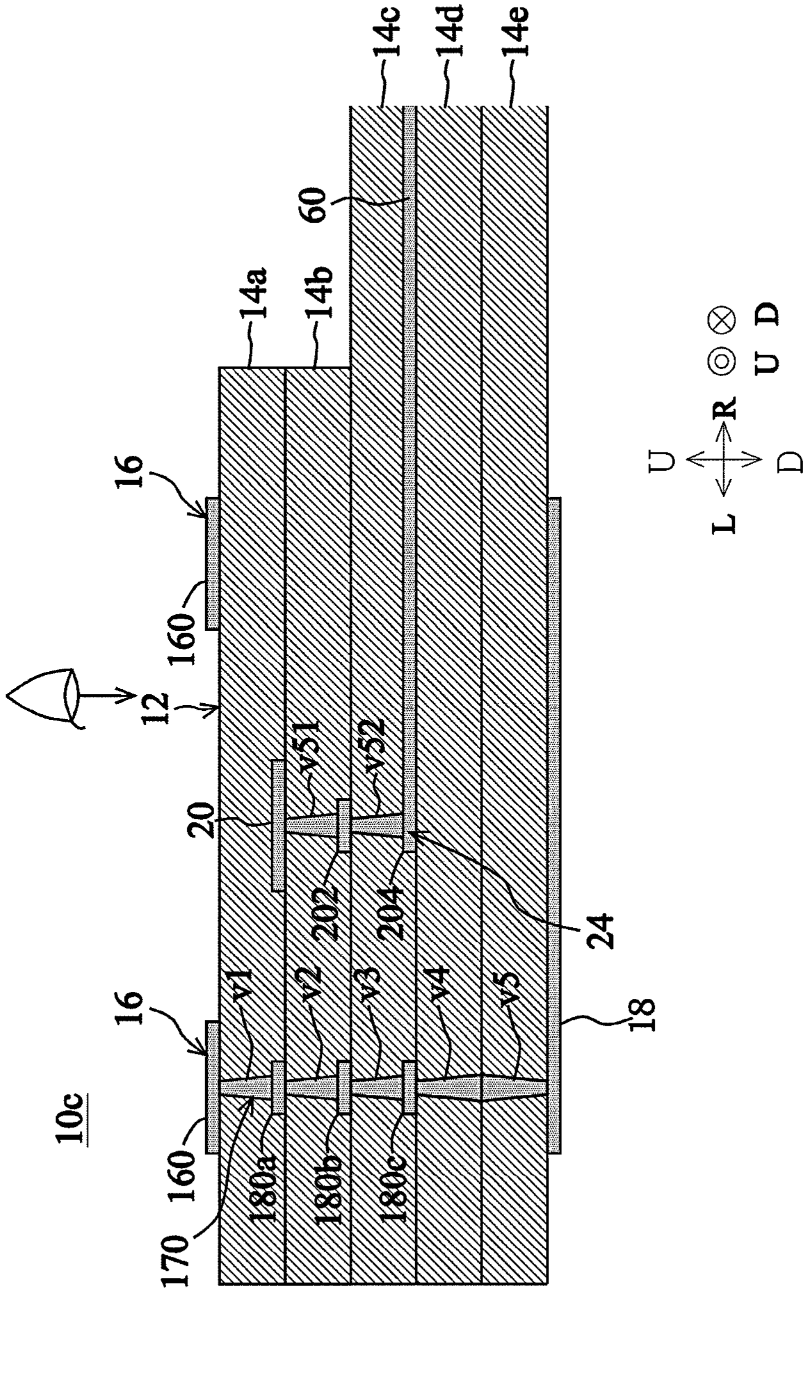
FIG. 5 is a cross-sectional view illustrating an antenna element 10*c*.

An antenna element 10*c* according to a third modification of a preferred embodiment of the present invention will be described with reference to the drawings. FIG. 5 is a cross-sectional view illustrating the antenna element 10*c*. The cross-section of the antenna element 10*c* in FIG. 5 is taken along the line corresponding to line A-A in FIG. 1.

The antenna element 10*c* is different from the antenna element 10 in that the antenna element 10*c* includes a signal conductor layer 60 in place of the signal electrode 22 and does not include the in-layer connection conductors v53 and v54.

The signal conductor layer 60 is disposed on the upper principal surface of the insulator layer 14*d*. The signal conductor layer 60 is connected to the lower end of the in-layer connection conductor v52. The signal conductor layer 60 extends rightward from the in-layer connection conductor v52. When the first radiation conductor layer 20 radiates and/or receives first high-frequency signals, the first high-frequency signals are transmitted through the signal conductor layer 60.

Note that the connection member 172 is located in front of or at the back of the signal conductor layer 60 so as to avoid interference with the signal conductor layer 60. Accordingly, the connection member 172 is not illustrated in FIG. 5. Other structural features of the antenna element 10*c* are the same as those of the antenna element 10, and duplicated descriptions will be omitted.

Note that the right portion of the insulation substrate 12 has a structure in which insulator layers 14*c* to 14*e* are laminated. This provides the right portion of the insulation substrate 12 with flexibility. Accordingly, the right portion of the insulation substrate 12 can be bent when in use.

According to the antenna element 10*c* described above, the signal conductor layer 60 through which first high-frequency signals are transmitted and the planar ground conductor layer 18 connected to the ground potential are disposed between the first ground conductor 16 and the first radiation conductor layer 20 as viewed in the up-down direction. Note that as viewed in the up-down direction, no conductor is provided between the first ground conductor 16 and the first radiation conductor layer 20 except for the signal conductor layer 60 through which the first high-frequency signals are transmitted and the planar ground conductor layer 18 connected to the ground potential.

FOURTH MODIFICATION

Figure 6:
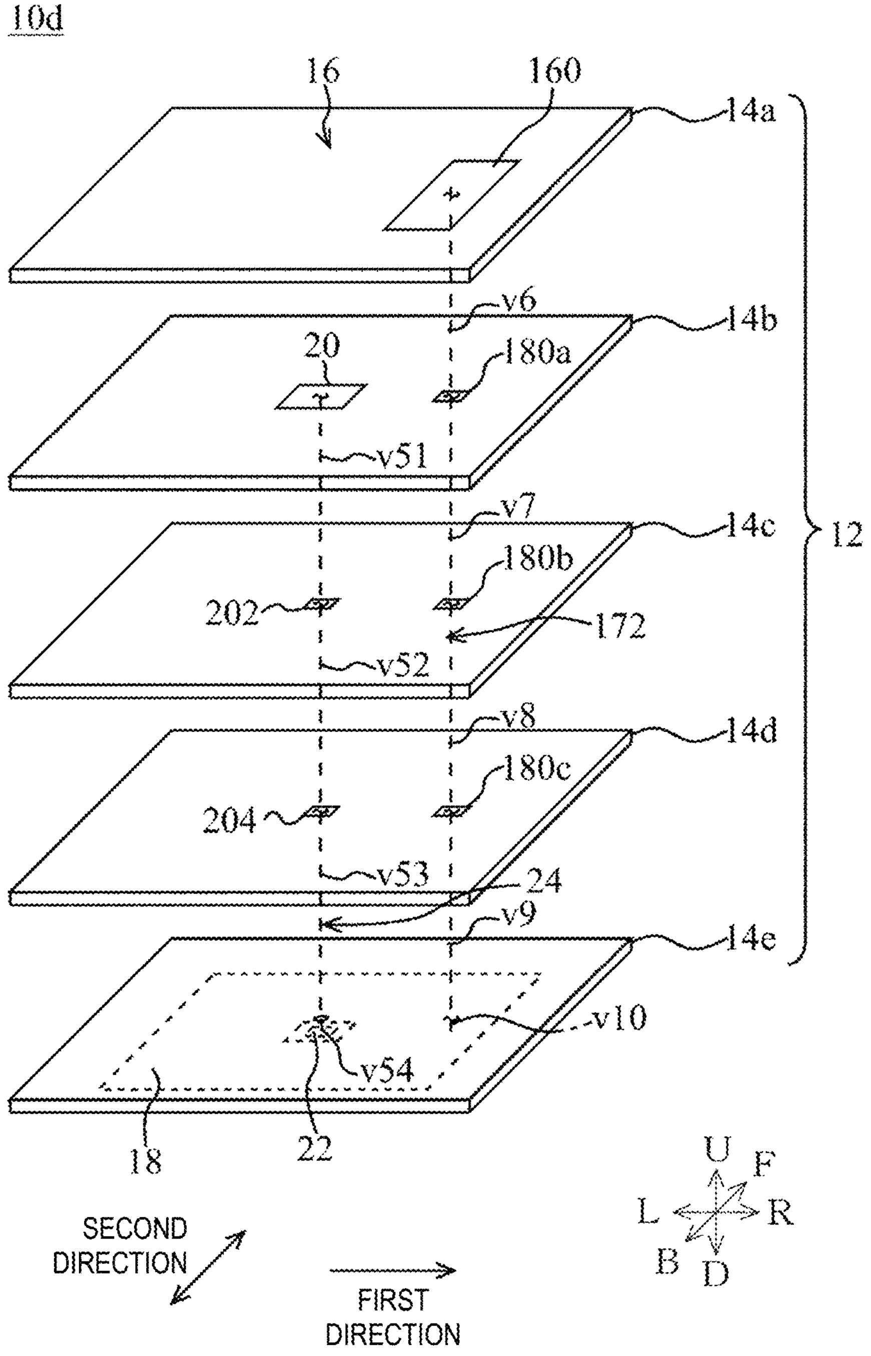
FIG. 6 is an exploded perspective view illustrating an antenna element 10*d*.

An antenna element 10*d* according to a fourth modification of a preferred embodiment of the present invention will be described with reference to the drawings. FIG. 6 is an exploded perspective view of the antenna element 10*d.*

The antenna element 10*d* is different from the antenna element 10 in that the upper-end ground conductor layer 160 of the antenna element 10*d* is different in shape and the antenna element 10*d* does not include the connection members 170, 174, and 176. More specifically, the upper-end ground conductor layer 160 is shaped like a rectangle or approximate rectangle as viewed in the up-down direction. The long sides of the upper-end ground conductor layer 160 extend in the front-back direction. The short sides of the upper-end ground conductor layer 160 extend in the right-left direction. The upper-end ground conductor layer 160 is disposed to the right of the first radiation conductor layer 20 as viewed in the up-down direction.

As viewed in the up-down direction, the direction from the first radiation conductor layer 20 to the upper-end ground conductor layer 160 is referred to as a first direction. In the present preferred embodiment, the first direction corresponds to the rightward direction. As viewed in the up-down direction, a second direction is defined as the direction perpendicularly or substantially perpendicularly intersecting the first direction. In the present preferred embodiment, the second direction corresponds to the front-back direction. The upper-end ground conductor layer 160 is longer than the first radiation conductor layer 20 in the second direction. In the present preferred embodiment, the upper-end ground conductor layer 160 is longer than the first radiation conductor layer 20 in the front-back direction. As viewed in the up-down direction, the upper-end ground conductor layer 160 may be present only at one side of the first radiation conductor layer 20 as in the antenna element 10*d.*

According to the antenna element 10*d*, the upper-end ground conductor layer 160 is positioned to the right of the first radiation conductor layer 20 as viewed in the up-down direction. The upper-end ground conductor layer 160 is longer than the first radiation conductor layer 20 in the front-back direction. Accordingly, the upper-end ground conductor layer 160 impedes high-frequency signals radiated by the first radiation conductor layer 20 from propagating obliquely to the upper right of the first radiation conductor layer 20. Thus, the antenna element 10*d* improves the directivity of the patch antenna.

FIFTH MODIFICATION

Figure 7:
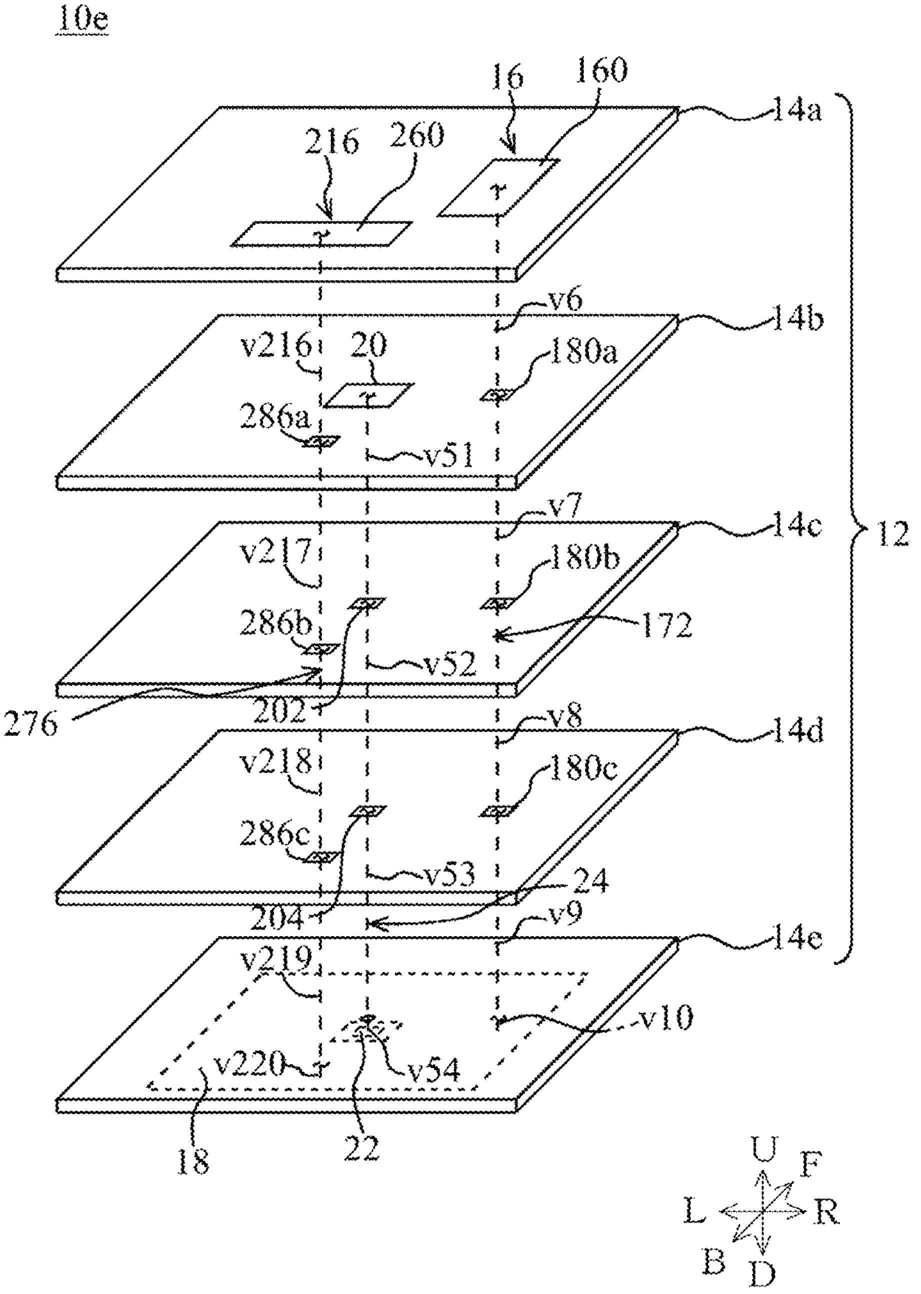
FIG. 7 is an exploded perspective view illustrating an antenna element 10*e*.

An antenna element 10*e* according to a fifth modification of a preferred embodiment of the present invention will be described with reference to the drawings. FIG. 7 is an exploded perspective view of the antenna element 10*e.*

The antenna element 10*e* is different from the antenna element 10*d* in that the antenna element 10*e* further includes a second ground conductor 216. The second ground conductor 216 is disposed on the insulation substrate 12. More specifically, the first ground conductor 16 and the second ground conductor 216 are spaced away from the first radiation conductor layer 20 in different directions as viewed in the up-down direction. More specifically, the first ground conductor 16 is positioned to the right of the first radiation conductor layer 20 as viewed in the up-down direction. The second ground conductor 216 is positioned at the back of the first radiation conductor layer 20 as viewed in the up-down direction.

The second ground conductor 216 includes an upper-end ground conductor layer 260, connection conductor layers 286*a* to 286*c*, and in-layer connection conductors v216 to v220. The upper-end ground conductor layer 260 is the uppermost conductor among the upper-end ground conductor layer 260, the connection conductor layers 286*a* to 286*c*, and the in-layer connection conductors v216 to v220. Accordingly, the upper-end ground conductor layer 260 includes the upper end of the second ground conductor 216. In the present preferred embodiment, the upper principal surface of the upper-end ground conductor layer 260 serves as the upper end of the second ground conductor 216.

The upper-end ground conductor layer 260 is shaped like a rectangle or approximate rectangle as viewed in the up-down direction. The long sides of the upper-end ground conductor layer 260 extend in the right-left direction. The short sides of the upper-end ground conductor layer 260 extend in the front-back direction. The upper-end ground conductor layer 260 is positioned at the back of the first radiation conductor layer 20 as viewed in the up-down direction.

The upper-end ground conductor layer 260, which is the upper end of the second ground conductor 216, is disposed on the upper principal surface of the insulator layer 14*a*. On the other hand, the first radiation conductor layer 20 is disposed on the upper principal surface of the insulator layer 14*b*. Accordingly, the upper end of the second ground conductor 216 (the upper principal surface of the upper-end ground conductor layer 260) is positioned above the first radiation conductor layer 20.

A connection member 276 includes the in-layer connection conductors v216 to v220 and the connection conductor layers 286*a* to 286*c*. The connection member 276 is disposed in the back portion of the insulation substrate 12. The connection member 276 is disposed at the back of the first radiation conductor layer 20 as viewed in the up-down direction. The connection member 276 electrically connects the upper-end ground conductor layer 260 to the planar ground conductor layer 18. Note that the structures of the in-layer connection conductors v216 to v220 and the connection conductor layers 286*a* to 286*c* are the same as those of the in-layer connection conductors v16 to v20 and the connection conductor layers 186*a* to 186*c*, and duplicated descriptions are omitted. Consequently, the second ground conductor 216 is connected to the ground potential.

The second ground conductor 216 described above is spaced away from the first radiation conductor layer 20 as viewed in the up-down direction. In other words, the second ground conductor 216 does not overlap the first radiation conductor layer 20 as viewed in the up-down direction. Moreover, as viewed in the up-down direction, no conductor is provided between the second ground conductor 216 and the first radiation conductor layer 20 except for the conductor through which the first high-frequency signals are transmitted and the conductor connected to the ground potential. In the present preferred embodiment, the planar ground conductor layer 18 is present and the other conductors are not present between the second ground conductor 216 and the first radiation conductor layer 20 as viewed in the up-down direction.

According to the antenna element 10*e*, as viewed in the up-down direction, the first ground conductor 16 and the second ground conductor 216 are spaced away from the first radiation conductor layer 20 in different directions. More specifically, the first ground conductor 16 is positioned to the right of the first radiation conductor layer 20 as viewed in the up-down direction. The second ground conductor 216 is positioned at the back of the first radiation conductor layer 20 as viewed in the up-down direction. As a result, the high-frequency signal radiated by the first radiation conductor layer 20 is impeded by the upper-end ground conductor layers 160 and 260 from obliquely propagating to the upper right and to the upper back of the first radiation conductor layer 20. Thus, the antenna element 10*e* improves the directivity of the patch antenna.

SIXTH MODIFICATION

Figure 8:
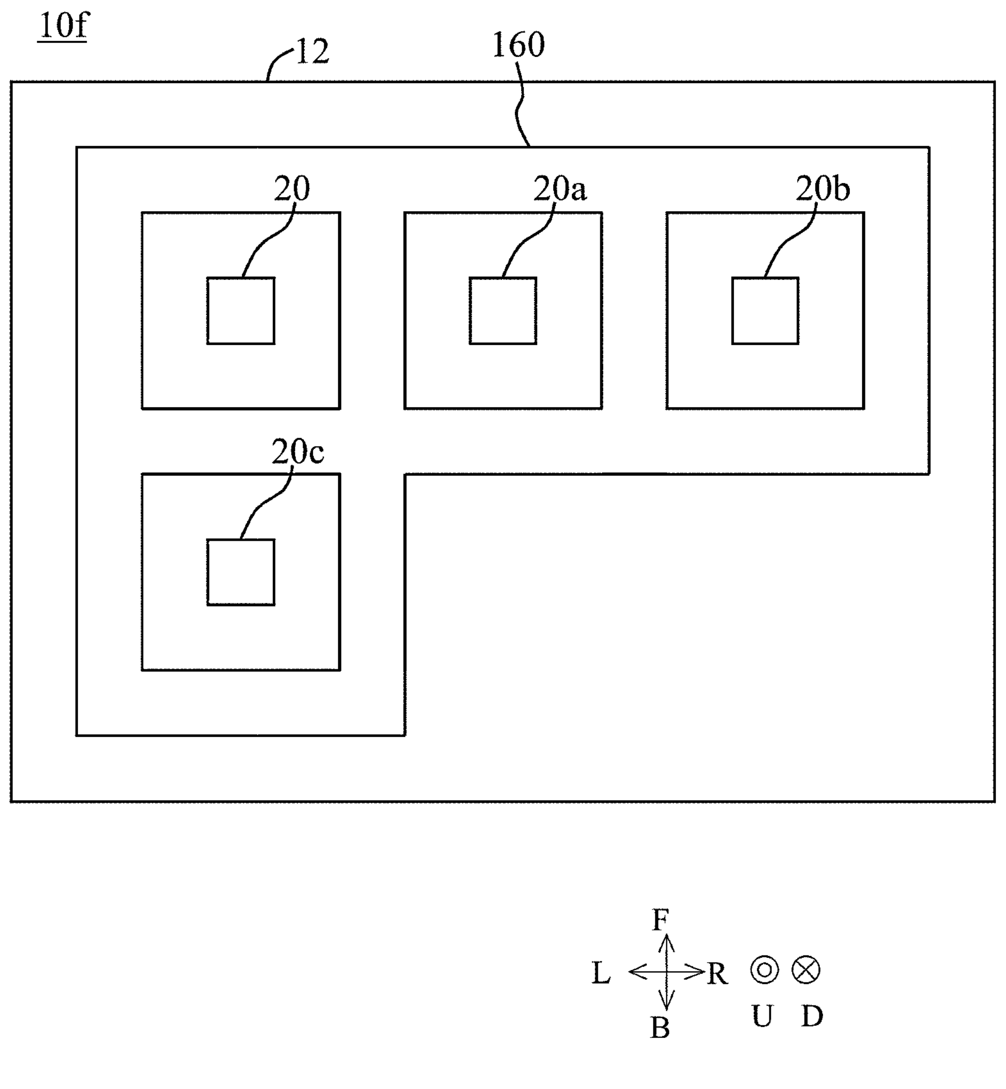
FIG. 8 is a top view illustrating an antenna element 10*f*, in which a first radiation conductor layer 20, second to fourth radiation conductor layers 20*a* to 20*c*, and an upper-end ground conductor layer 160 are shown.

An antenna element 10*f* according to a sixth modification of a preferred embodiment of the present invention will be described with reference to the drawings. FIG. 8 is a top view illustrating an antenna element 10*f*, in which a first radiation conductor layer 20, second to fourth radiation conductor layers 20*a* to 20*c*, and an upper-end ground conductor layer 160 are shown.

The antenna element 10*f* is different from the antenna element 10 in the presence of the second to fourth radiation conductor layers 20*a* to 20*c* and the shape of the upper-end ground conductor layer 160. The antenna element 10*f* further includes the second to fourth radiation conductor layers 20*a* to 20*c*.

The second to fourth radiation conductor layers 20*a* to 20*c* radiate and/or receive second to fourth high-frequency signals, respectively. The second to fourth radiation conductor layers 20*a* to 20*c* are disposed in the insulation substrate 12. In the present preferred embodiment, the second to fourth radiation conductor layers 20*a* to 20*c* are disposed on the upper principal surface of the insulator layer 14*b*. Accordingly, the second to fourth radiation conductor layers 20*a* to 20*c* are positioned above the planar ground conductor layer 18 (a second planar ground conductor layer, which is not illustrated in FIG. 8). Accordingly, the lower principal surfaces of the second to fourth radiation conductor layers 20*a* to 20*c* overlap the upper principal surface of the planar ground conductor layer 18 (second planar ground conductor layer) as viewed in the up-down direction.

The first radiation conductor layer 20, the second radiation conductor layer 20*a*, and the third radiation conductor layer 20*b* are disposed in a row in this order from left to right as viewed in the up-down direction. The fourth radiation conductor layer 20*c* is disposed at the back of the first radiation conductor layer 20 as viewed in the up-down direction.

The upper-end ground conductor layer 160 is shaped such that belt shapes, which respectively surround the first radiation conductor layer 20 and the second to fourth radiation conductor layers 20*a* to 20*c*, are combined together as viewed in the up-down direction. Accordingly, the upper-end ground conductor layer 160 (the first ground conductor 16) is present between the first radiation conductor layer 20 and the second radiation conductor layer 20*a* as viewed in the up-down direction. The upper-end ground conductor layer 160 (the first ground conductor 16) is also present between the second radiation conductor layer 20*a* and the third radiation conductor layer 20*b* as viewed in the up-down direction. The upper-end ground conductor layer 160 (the first ground conductor 16) is also present between the first radiation conductor layer 20 and the fourth radiation conductor layer 20*c* as viewed in the up-down direction. With this configuration, the isolation between adjacent ones of the first radiation conductor layer 20 and the second to fourth radiation conductor layers 20*a* to 20*c* can be improved.

The upper-end ground conductor layer 160 is disposed on the upper principal surface of the insulator layer 14*a*. The first radiation conductor layer 20 and the second to fourth radiation conductor layers 20*a* to 20*c* are disposed on the upper principal surface of the insulator layer 14*b*. Accordingly, the upper end of the first ground conductor 16 (the upper principal surface of the upper-end ground conductor layer 160) is positioned above the first radiation conductor layer 20 and the second to fourth radiation conductor layers 20*a* to 20*c*.

The first ground conductor layer 16 is spaced away from the first radiation conductor layer 20 and also from the second to fourth radiation conductor layers 20*a* to 20*c* as viewed in the up-down direction. In addition, as viewed in the up-down direction, no conductor is provided between the first ground conductor 16 and the first radiation conductor layer 20 except for the conductor through which the first high-frequency signals are transmitted and the conductor connected to the ground potential. As viewed in the up-down direction, no conductor is provided between the first ground conductor 16 and the second radiation conductor layer 20*a* except for the conductor through which the second high-frequency signals are transmitted and the conductor connected to the ground potential. As viewed in the up-down direction, no conductor is provided between the first ground conductor 16 and the third radiation conductor layer 20*b* except for the conductor through which the third high-frequency signals are transmitted and the conductor connected to the ground potential. As viewed in the up-down direction, no conductor is provided between the first ground conductor 16 and the fourth radiation conductor layer 20*c* except for the conductor through which the fourth high-frequency signals are transmitted and the conductor connected to the ground potential.

SEVENTH MODIFICATION

Figure 9:
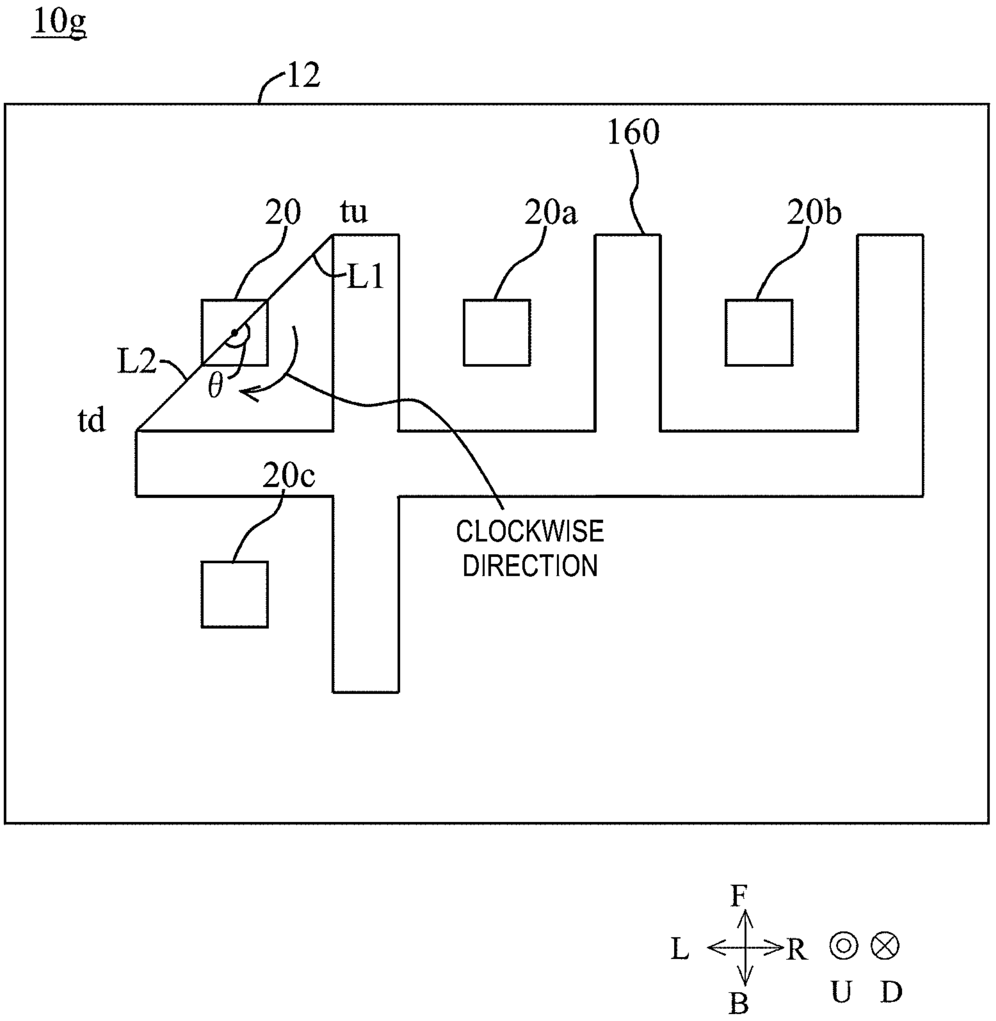
FIG. 9 is a top view illustrating an antenna element 10*g*, in which a first radiation conductor layer 20, second to fourth radiation conductor layers 20*a* to 20*c*, and an upper-end ground conductor layer 160 are shown.

An antenna element 10*g* according to a seventh modification of a preferred embodiment of the present invention will be described with reference to the drawings. FIG. 9 is a top view illustrating an antenna element 10*g*, in which the first radiation conductor layer 20, the second to fourth radiation conductor layers 20*a* to 20*c*, and an upper-end ground conductor layer 160 are shown.

The antenna element 10*g* is different from the antenna element 10*f* in the shape of the upper-end ground conductor layer 160. More specifically, the upper-end ground conductor layer 160 is not present to the left and to the front of the first radiation conductor layer 20 as viewed in the up-down direction. The upper-end ground conductor layer 160 is not present in front of the second radiation conductor layer 20*a* as viewed in the up-down direction. The upper-end ground conductor layer 160 is not present in front of the third radiation conductor layer 20*b* as viewed in the up-down direction. The upper-end ground conductor layer 160 is not present to the left and to the back of the fourth radiation conductor layer 20*c* as viewed in the up-down direction.

Accordingly, the upper-end ground conductor layer 160 does not need to be shaped such that belt shapes, which respectively surround the first radiation conductor layer 20 and the second to fourth radiation conductor layers 20*a* to 20*c*, are combined together as viewed in the up-down direction. In the antenna element 10*g*, however, the upper-end ground conductor layer 160 has a structure as described below. A first straight line L1 is defined as a straight line connecting the first radiation conductor layer 20 to an upstream end tu of the upper-end ground conductor layer 160 in a clockwise direction with the first radiation conductor layer 20 being positioned at the center as viewed in the up-down direction. A second straight line L2 is defined as a straight line connecting the first radiation conductor layer 20 to a downstream end td of the upper-end ground conductor layer 160 in the clockwise direction with the first radiation conductor layer 20 being positioned at the center as viewed in the up-down direction. In this case, an angle θ between the first straight line L1 and the second straight line L2 is about 180 degrees or more, for example. Here, the angle θ between the first straight line L1 and the second straight line L2 is the angle in a region surrounded by the first straight line L1, the second straight line L2, and the upper-end ground conductor layer 160. Accordingly, as viewed in the up-down direction, the upper-end ground conductor layer 160 is present around at least a half of the periphery of the first radiation conductor layer 20. Similarly, as viewed in the up-down direction, the upper-end ground conductor layer 160 is present around at least a half of the periphery of each of the second to fourth radiation conductor layers 20*a* to 20*c*. This can improve the directivity of each of the first radiation conductor layer 20 and the second to fourth radiation conductor layers 20*a* to 20*c* in the antenna element 10*g*.

Note that one ends of the first straight line L1 and the second straight line L2 are positioned at the centroid of the first radiation conductor layer 20 as viewed in the up-down direction.

EIGHTH MODIFICATION

An antenna element 10*h* according to an eighth modification of a preferred embodiment of the present invention will be described with reference to the drawings.

Figure 10:
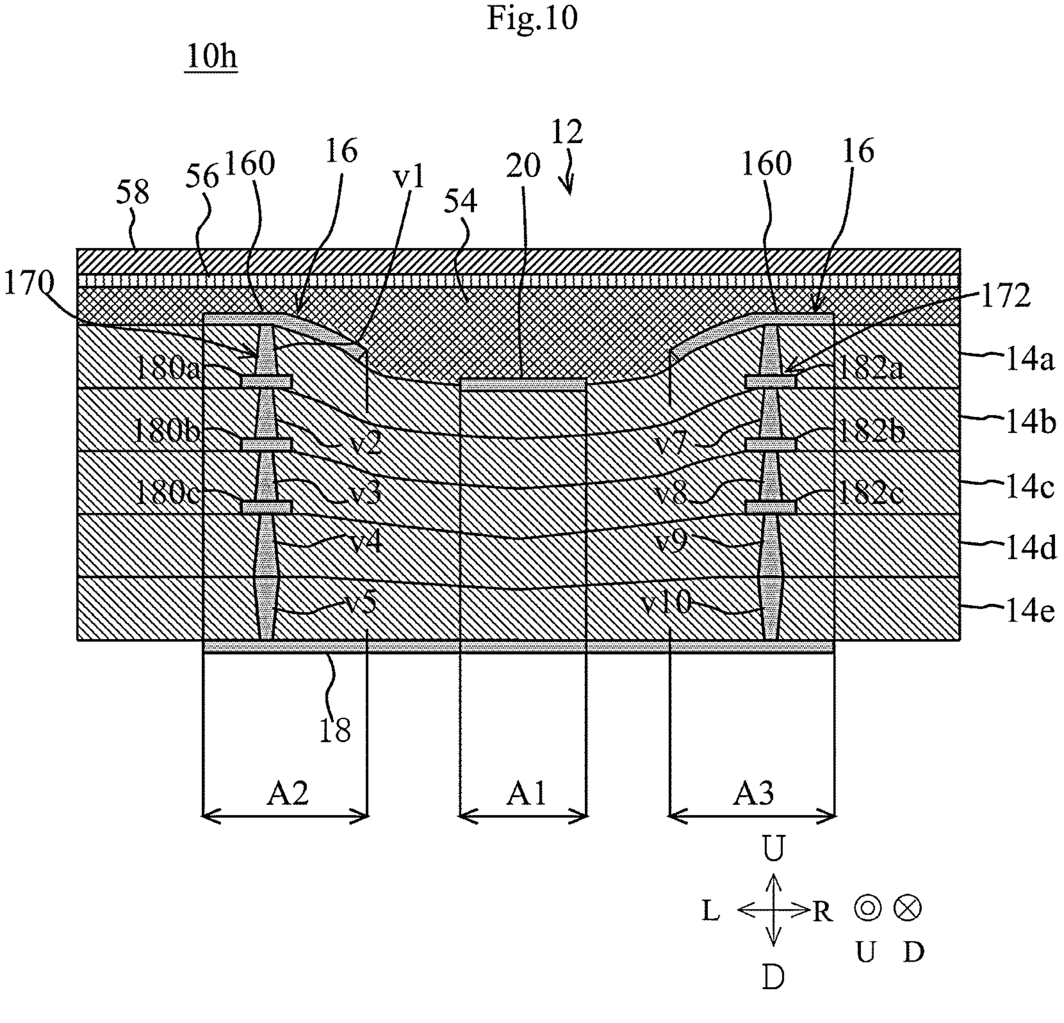
FIG. 10 is a cross-sectional view illustrating an antenna element 10*h*.

FIG. 10 is a cross-sectional view illustrating the antenna element 10*h*. The cross-section of the antenna element 10*h* in FIG. 10 is taken along the line corresponding to line A-A in FIG. 1.

The antenna element 10*h* is different from the antenna element 10 in that the first radiation conductor layer 20 of the antenna element 10*h* is formed on the upper principal surface of the insulator layer 14*a*. More specifically, the insulator layer 14*a* among the insulator layers 14*a* to 14*e* serves as a first insulator layer. The upper-end ground conductor layer 160 and the first radiation conductor layer 20 are disposed on the insulator layer 14*a* (first insulator layer). In the present preferred embodiment, the upper-end ground conductor layer 160 and the first radiation conductor layer 20 are disposed on the upper principal surface of the insulator layer 14*a* (first insulator layer).

In FIG. 10, regions A2 and A3 are defined as regions of the insulation substrate 12 on which the first ground conductor 16 is disposed. A region A1 is defined as a region of the insulation substrate 12 on which the first radiation conductor layer 20 is disposed. In manufacturing the antenna element 10*h*, the insulation substrate 12 is press-bonded such that the pressure applied on the region A1 is larger than the pressure applied on the regions A2 and A3. In the process of press-bonding the insulation substrate 12, the region A1 is compressed more largely compared with the regions A2 and A3. As a result, the insulator layer 14*a* is bent in the up-down direction. More specifically, the insulator layer 14*a* in the region A1 is positioned lower than the insulator layer 14*a* in the regions A2 and A3. The insulator layer 14*a* (first insulator layer) is bent in the up-down direction such that the upper end of the upper-end ground conductor layer 160 is positioned above the first radiation conductor layer 20. Since the insulator layer 14*a* (first insulator layer) is bent in the up-down direction, the upper-end ground conductor layer 160 is also bent in the up-down direction. In other words, the upper-end ground conductor layer 160 is bent in the up-down direction so as to follow the bending of the insulator layer 14*a* (first insulator layer) in the up-down direction. Accordingly, the upper-end ground conductor layer 160 and the in-layer connection conductors are present in the right-left direction from the first radiation conductor layer 20. This can improve the directivity of the antenna element 10*h*. In addition, this can improve the isolation between adjacent radiation conductor layers in the case of the antenna element 10*h* including multiple radiation conductor layers.

The antenna element 10*h* further includes a resist layer 54, a bonding layer 56, and a resin layer 58. The resist layer 54, the bonding layer 56, and the resin layer 58 are laminated on the insulation substrate 12 in this order from bottom to top. The dielectric constant of the resist layer 54 is higher than the dielectric constant of the insulation substrate 12. The dielectric constant of the bonding layer 56 is higher than that of the resist layer 54. The dielectric constant of the resin layer 58 is higher than that of the bonding layer 56.

Thus, the upper end of the upper-end ground conductor layer 160 can be raised above the first radiation conductor layer 20 using deformation of the insulation substrate 12 as in the antenna element 10*h*.

Other Preferred Embodiments

The antenna elements according to preferred embodiments of the present invention are not limited to the antenna elements 10 and 10*a* to 10*h* but can be further modified within the scope of the present invention. The structural features of the antenna elements 10 and 10*a* to 10*h* can be combined in an arbitrary manner.

Note that the upper end of the first ground conductor 16 is the upper surface of the upper-end ground conductor layer 160 in the antenna elements 10 and 10*a* to 10*h*. However, an in-layer connection conductor may also be disposed on the upper-end ground conductor layer 160. In this case, the upper end of the first ground conductor 16 is the upper end of the in-layer connection conductor. Accordingly, the upper end of the first ground conductor 16 may be the upper end of a member other than the upper-end ground conductor layer 160. The upper-end ground conductor layer 160 may be bent in the up-down direction as is the case for the antenna element 10*h*. In this case, the upper end of the first ground conductor 16 is the uppermost portion of the upper principal surface of the upper-end ground conductor layer 160.

In the antenna elements 10, 10*a* to 10*c*, 10*f*, and 10*h*, the upper-end ground conductor layer 160 does not need to have the belt shape as viewed in the up-down direction.

In the antenna elements 10*d* and 10*e*, the length of the upper-end ground conductor layer 160 in the front-back direction is equal to or smaller than the length of the first radiation conductor layer 20 in the front-back direction.

In the antenna element 10*g*, the angle θ between the first straight line L1 and the second straight line L2 may be smaller than about 180 degrees.

In the antenna elements 10*f* and 10*g*, the first ground conductor 16 does not need to be positioned between the first radiation conductor layer 20 and the second radiation conductor layer 20*a* as viewed in the up-down direction.

In the antenna element 10*e*, for example, the upper-end ground conductor layer 160 may be positioned to the right of the first radiation conductor layer 20 and the upper-end ground conductor layer 260 may be positioned to the left of the first radiation conductor layer 20 as viewed in the up-down direction.

In the antenna elements 10*a* and 10*b*, the dielectric constant of the first insulation member 50 is equal to or lower than that of the insulation substrate 12. In the antenna element 10*b*, the dielectric constant of the second insulation member 52 is equal to or lower than that of the first insulation member 50.

The antenna element 10*f* may further include the second planar ground conductor layer in addition to the planar ground conductor layer 18. In this case, the lower principal surface of the first radiation conductor layer 20 overlaps the upper principal surface of the planar ground conductor layer 18 as viewed in the up-down direction. The lower principal surfaces of the second to fourth radiation conductor layers 20*a* to 20*c* overlap the upper principal surface of the second planar ground conductor layer as viewed in the up-down direction. In other words, the first planar ground conductor layer and the second planar ground conductor layer can be a single planar ground conductor layer or two planar ground conductor layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed:

1. An antenna element comprising:
- an insulation substrate;
- a first planar ground conductor layer;
- a first radiation conductor layer; and
- a first ground conductor; wherein
- the first planar ground conductor layer is connected to a ground potential and is on the insulation substrate;
- the first radiation conductor layer is operable to radiate and/or receive first high-frequency signals;
- the first radiation conductor layer is in or on the insulation substrate and above the first planar ground conductor layer;
- a lower principal surface of the first radiation conductor layer overlaps an upper principal surface of the first planar ground conductor layer as viewed in an up-down direction;
- the first ground conductor is in the insulation substrate and connected to the ground potential;
- an upper end of the first ground conductor is above the first radiation conductor layer;
- the first ground conductor layer is spaced away from the first radiation conductor layer as viewed in the up-down direction; and
- no conductor is present between the first ground conductor and the first radiation conductor layer except for a conductor through which the first high-frequency signals are transmitted and a conductor connected to the ground potential.

2. The antenna element according to claim 1, wherein
- the first ground conductor includes an upper-end ground conductor layer that includes the upper end of the first ground conductor; and
- the upper-end ground conductor layer has a belt shape that surrounds the first radiation conductor layer as viewed in the up-down direction.

3. The antenna element according to claim 1, wherein
- the first ground conductor includes an upper-end ground conductor layer that includes the upper end of the first ground conductor; and
- when, as viewed in the up-down direction, a first direction is defined as a direction from the first radiation conductor layer to the upper-end ground conductor layer and a second direction is defined as a direction perpendicularly or substantially perpendicularly intersecting the first direction, the upper-end ground conductor layer is longer than the first radiation conductor layer in the second direction.

4. The antenna element according to claim 3, wherein
- a first straight line is defined as a straight line connecting the first radiation conductor layer to an upstream end of the upper-end ground conductor layer in a clockwise direction with the first radiation conductor layer being positioned at a center as viewed in the up-down direction;
- a second straight line is defined as a straight line connecting the first radiation conductor layer to a downstream end of the upper-end ground conductor layer in the clockwise direction with the first radiation conductor layer being positioned at the center as viewed in the up-down direction; and
- an angle between the first straight line and the second straight line is about 180 degrees or more, the angle being in a region surrounded by the first straight line, the second straight line, and the upper-end ground conductor layer.

5. The antenna element according to claim 1, further comprising:
- a second radiation conductor layer; and
- a second planar ground conductor layer; wherein
- the second radiation conductor layer is operable to radiate and/or receive second high-frequency signals;
- the second radiation conductor layer is in or on the insulation substrate and above the second planar ground conductor layer;
- a lower principal surface of the second radiation conductor layer overlaps an upper principal surface of the second planar ground conductor layer as viewed in the up-down direction;
- the upper end of the first ground conductor is above the second radiation conductor layer;
- the first ground conductor layer is spaced away from the second radiation conductor layer as viewed in the up-down direction;
- no conductor is present between the first ground conductor and the second radiation conductor layer except for a conductor through which the second high-frequency signals are transmitted and a conductor connected to the ground potential; and
- the first ground conductor is between the first radiation conductor layer and the second radiation conductor layer as viewed in the up-down direction.

6. The antenna element according to claim 1, further comprising:
- a second ground conductor; wherein the second ground conductor is in the insulation substrate and connected to the ground potential;
an upper end of the second ground conductor is above the first radiation conductor layer;
the second ground conductor is spaced away from the first radiation conductor layer as viewed in the up-down direction;
no conductor is present between the second ground conductor and the first radiation conductor layer except for a conductor through which the first high-frequency signals are transmitted and a conductor connected to the ground potential; and
the first ground conductor and the second ground conductor are respectively spaced away from the first radiation conductor layer in different directions.

7. The antenna element according to claim 1, further comprising:
a first insulator; wherein
the first insulator is on the insulation substrate and overlaps the first radiation conductor layer as viewed in the up-down direction; and
a dielectric constant of the first insulator is higher than that of the insulation substrate.

8. The antenna element according to claim 7, wherein the first insulator overlaps the first ground conductor as viewed in the up-down direction.

9. The antenna element according to claim 7, further comprising:
a second insulator; wherein
the second insulator is on the first insulator and overlaps the first radiation conductor layer as viewed in the up-down direction; and
a dielectric constant of the second insulator is higher than that of the first insulator.

10. The antenna element according to claim 1, wherein
the insulation substrate has a structure in which a plurality of insulator layers is laminated in the up-down direction;
the first ground conductor includes the upper-end ground conductor layer that includes the upper end of the first ground conductor;
the plurality of insulator layers includes a first insulator layer;
the upper-end ground conductor layer and the first radiation conductor layer are on the first insulator layer; and
the first insulator layer is bent in the up-down direction such that the upper end of the upper-end ground conductor layer is positioned above the first radiation conductor layer.

11. The antenna element according to claim 10, wherein the upper-end ground conductor layer has a bent shape that corresponds to a shape of the first insulator layer that is bent in the up-down direction.

12. The antenna element according to claim 1, wherein the antenna element has a rectangular or substantially rectangular shape.

13. The antenna element according to claim 10, wherein
the first ground conductor includes in-layer connection conductors;
the upper-end ground conductor layer is bent in the up-down direction; and
the upper-end ground conductor layer and the in-layer connection conductors are located in a right-left direction perpendicular or substantially perpendicular to the up-down direction from the first radiation conductor layer.

14. The antenna element according to claim 1, further comprising:
a second ground conductor on the insulation substrate; wherein
the first ground conductor and the second ground conductor are respectively spaced away from the first radiation conductor layer in different directions as viewed in the up-down direction.

15. The antenna element according to claim 14, wherein
the second ground conductor includes an upper-end ground conductor layer, connection conductor layers, and in-layer connection conductors; and
the upper-end ground conductor layer includes an upper end of the second ground conductor.

16. The antenna element according to claim 15, wherein the upper end of the second ground conductor is above the first radiation conductor layer.

17. The antenna element according to claim 14, wherein the second ground conductor layer is spaced away from the first radiation conductor layer as viewed in the up-down direction.

18. The antenna element according to claim 1, further comprising:
a second radiation conductor layer;
a third radiation conductor layer;
a fourth radiation conductor layer; and
an upper-end ground conductor layer.

19. The antenna element according to claim 18, wherein
the upper-end ground conductor layer is not present to the left and to the front of the first radiation conductor layer as viewed in the up-down direction;
the upper-end ground conductor layer is not present in front of the second radiation conductor layer as viewed in the up-down direction;
the upper-end ground conductor layer is not present in front of the third radiation conductor layer as viewed in the up-down direction; and
the upper-end ground conductor layer is not present to the left and to the back of the fourth radiation conductor layer as viewed in the up-down direction.

20. The antenna element according to claim 18, wherein the upper-end ground conductor layer is located around at least a half of a periphery of each of the second radiation conductor layer, the third radiation conductor layer, and the fourth radiation conductor layer.

* * * * *